Feb. 7, 1928.
A. J. BOND
1,658,629
WHEELED TRACTOR SCOOP
Filed Jan. 18, 1927
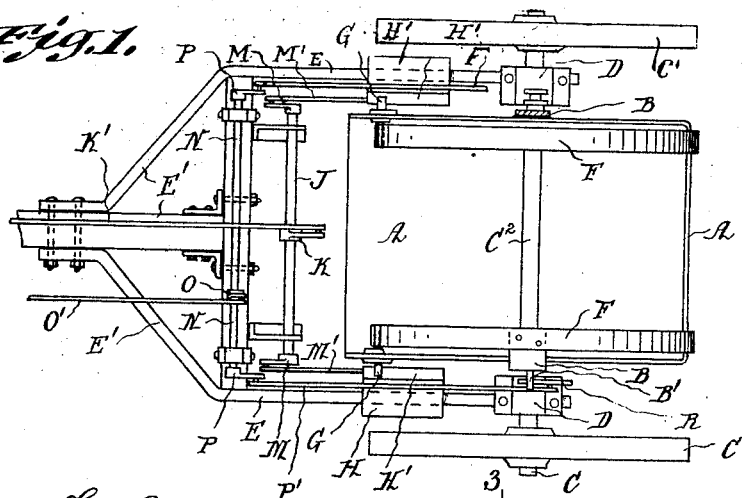
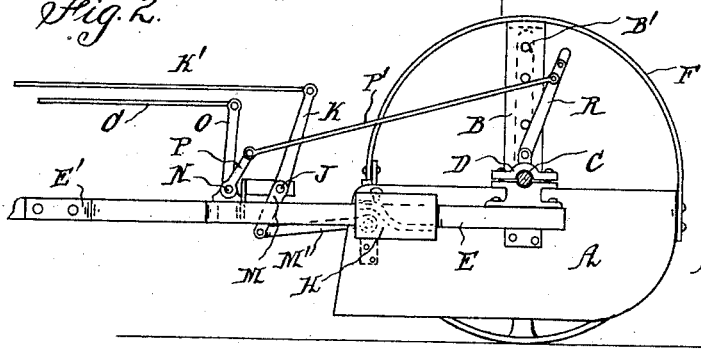
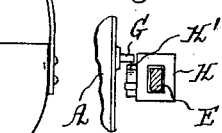
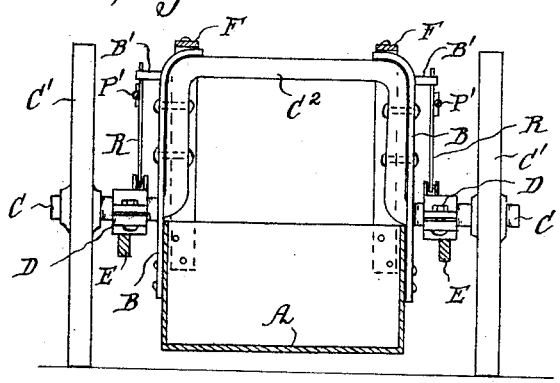
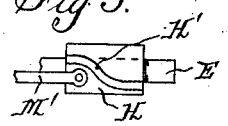

Patented Feb. 7, 1928.

1,658,629

UNITED STATES PATENT OFFICE.

ALFRED JOHN BOND, OF AUCKLAND, NEW ZEALAND.

WHEELED-TRACTOR SCOOP.

Application filed January 18, 1927, Serial No. 161,723, and in New Zealand February 8, 1926.

This invention relates to a scoop designed to be drawn by a tractor and mounted on wheels.

The invention has for its object a manner of constructing and mounting the scoop upon its wheels, and also means for controlling its operations so that the control may all be effected by the tractor driver from his seat upon the tractor. This control is adapted to lower the scoop into working position, or to raise it clear of the ground so that it may be moved on its wheels with its load, and also to provide for the scoop being overturned at any point, to discharge its load, and then righted again and held clear of the ground in order that it may be run back to the point of operation.

The invention consists in the features of construction and the arrangement of the parts by means of which these advantages are obtained.

These features will be hereinafter more fully described in relation to the accompanying drawings, and will be specifically set forth in the claiming clauses hereof.

In the drawings:—

Figure 1 is a plan of the scoop, a portion of the mechanism on one side being removed.

Figure 2 is a side elevation thereof.

Figure 3 is a sectional front elevation taken on the line 3—3 of Figure 2.

Figures 4 and 5 are detail views of a sliding block whose function will be afterwards described.

Figure 6 is a detail view of the end of a lever whose function also will be afterwards described.

According to this invention the scoop A is made of the well known form having a flat bottom, open front and top, and raised sides and back. To each of its sides, a frame plate B is affixed such plate extending upward for a distance. The scoop is mounted on an axle C carried on wheels C' and such axle passes in through each side and in between the sides, is cranked, as at $C^2$, the sides of the crank extending up upon the inside of the frame plates B and being made fast thereto.

The axle C is journalled in bearings D situated on each side of the scoop and such bearings are supported upon the side members E of a draught frame E' and which side members extend forwardly of the scoop for a distance before joining up with the main draught frame. This draught frame is made in any manner suitable for attachment to the tractor by means of which the scoop is to be worked.

The extent of the cranking of the axle C is such as to provide that the cranked portion may swing right over to reverse the scoop, turning in the wheels and bearings as pivots, and to provide for such reversal being effected by the draught of the scoop, a curved bar F is attached to each side edge of the scoop, such bar extending in an arc from the back edge of the scoop, up and over to its front edge. These bars and the crank axle therefore provide that when the scoop front is caused to engage the ground (in a manner hereinafter described) and the draught pull is maintained, the scoop will turn forwardly and over, running on the bars, as on wheels, so that it becomes reversed, and then as the travel continues, rights itself again.

The scoop is thus swung in the wheels and its weight is so disposed that its forward end has a normal tendency to drop to the ground into the usual scooping position. Such end, however, is supported, on each side of the scoop, by means of a pin G projecting from its side and a block H (shown in detail in Figures 4 and 5) mounted on the corresponding side member E of the draught frame and which block has a ledge H' formed to extend along upon its inside, on which the pin G rests. This ledge is curved or inclined downwards from its forward to its rear end, and the block is so mounted on the member E that it is kept from turning but is capable of sliding to and fro along it. The ledges are also so disposed in relation to the ground level that when the pins G are resting on their higher ends, the scoop front is kept raised to keep the scoop level, and when resting on their lower ends the scoop front is dropped to engage the ground, or the blocks may be drawn forwardly enough to free the pins altogether.

Thus by moving the blocks H to and fro along the respective members E, the scoop may, at will, be raised clear of the ground in order that it may be carried free on its wheels, or its front may be dropped to engage the ground and thereby to cause the scoop to carry on its operations as it is drawn forward.

To provide for the scoop being thus controlled to be raised and lowered, by the tractor driver, a spindle J is provided and mounted transversely in the front of the draught frame E'. To this spindle a lever K is affixed and from the lever an actuating rod K' is carried forward to the tractor, so that by pushing and pulling the rod, the spindle may be rocked in its bearings. At each end of the spindle, a crank arm M is affixed and such arm is connected by the connecting rod M' with the block H on that side, so that the to and fro movements of the rod K' will slide the two blocks H simultaneously forward or rearward. Consequently in the working of the scoop the tractor driver by pushing the rod K' rearward will drop the scoop front into working position, and then when the scoop has filled, by pulling it forward, will raise the scoop front clear of the ground so that the filled scoop may be run to the point at which its load is to be deposited.

For the tipping of the scoop, a second spindle N is provided and mounted to extend transversely on the forward part of the draught frame E'. This spindle also has a lever O secured to it and from which lever an operating rod O' is carried forwardly to the tractor so that it also may be used to turn the spindle in its bearings. At each end of this spindle, also, is a crank arm P and from the crank arm a connecting rod P' leads rearwards. A lever arm R is pivoted to the top of the axle bearing D on each corresponding side and such lever is carried upward for a suitable distance to adapt it for engagement with a stop B' projecting laterally from the frame plate B on that side. The lever end normally occupies a position to the rear of such stop piece and the connecting rod P' is attached to it so that by the manipulation of the spindle N (through the lever O and the rod O') the lever arm R may be drawn forward and pushed back.

The extremity of this arm R is so made (as shown in the detail, Figure 6) that it acts rigidly when the arm is drawn forwardly so that it will engage the stop B' and tend to tip the scoop forwardly, and will slip idly beneath such stop when it is pushed back.

Thus if the rod K' has first been operated to drop the front of the scoop and free its pins G from the blocks H in the manner described, the operation of the rod O' in one direction will cause the scoop front end to be tipped down to dig into and grip the ground, so that the continuous travel of the scoop will result in the scoop being tipped forwardly and over, to discharge its contents, and then as the travel continues (the blocks H being meanwhile replaced by operating the rod K') will turn over to its normal transporting level by the pins G being engaged and supported by the ledges H'. When this has been done, the lever arms R may be moved back to the rear of the stops B' ready for the next operation.

It will therefore be seen that in the operations of the scoop, it may be run to the working point, its front end lowered, the scoop filled and lifted clear of the ground and finally the scoop tipped, to discharge its contents, and righted into working position again, all control being effected through the operation of the rods K' and O' by the tractor driver, without leaving his seat.

Suitable stops of any approved nature may be provided for regulating the movements of the rods K' and O' within the limits necessary to obtain the required effects.

I claim:—

1. In scoops, a scoop body attached to and suspended upon a cranked axle mounted on running wheels, so that the scoop front end will normally drop down, a draught frame having side bar members on which such axle is journalled, a block mounted to slide along each side member and formed with a ledge extending along its inside and curving downward from one end to the other, a pin projecting from the forward end of that side of the scoop and resting on such ledge, and means whereby both blocks may be moved simultaneously to and fro along their respective draught members, through the rotative operation of a spindle, substantially as specified.

2. In scoops constructed and mounted, as described in claim 1, the combination with the scoop body of an upwardly extending side plate on each side and between which side plates the said axle is cranked and has the side plates affixed to its cranked portion, a curved plate on each side edge of the scoop body extending in an arc from the back of the body up and over the cranked axle and down to the front of the body, and means whereby the scoop body may have its front end tipped down to engage the ground, through the rotative movement of a spindle, substantially as and for the purposes specified.

3. In scoops constructed and mounted as described in claim 1, means for moving the said blocks consisting in the combination with the spindle, of a crank arm on each end thereof, a connecting rod extending between such crank arm and the block on that side, a lever arm fixed to the spindle, and an operating rod extending forwardly from such lever arm, substantially as specified.

4. In scoops constructed and mounted as described in claim 1, means for tipping the scoop body forwardly comprising the combination with a spindle mounted to extend across the front of the draught frame, of a lever fixed thereon and an operating rod connected to such lever extending forwardly for a distance, a crank arm on each end of the spindle, a lever arm pivoted on the corresponding draught side member, near its rear end, a stop piece projecting laterally from the top of the said scoop body side plate, with which the lever end on that side is adapted to engage when it is turned forwardly, and a connecting rod extending from the said lever arm to the crank arm on the corresponding side, substantially as specified.

In testimony whereof, I affix my signature.

ALFRED JOHN BOND.